(12) United States Patent
Loos

(10) Patent No.: US 8,920,649 B2
(45) Date of Patent: Dec. 30, 2014

(54) FILTER FOR AN INTERNAL COMBUSTION ENGINE AND FILTER CARTRIDGE FOR THE OIL FILTER

(75) Inventor: Rainer Loos, Freiberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 863 days.

(21) Appl. No.: 12/335,785

(22) Filed: Dec. 16, 2008

(65) Prior Publication Data

US 2009/0159520 A1     Jun. 25, 2009

(30) Foreign Application Priority Data

Dec. 20, 2007   (DE) .................... 20 2007 017 964 U

(51) Int. Cl.
| | | |
|---|---|---|
| *B01D 35/02* | (2006.01) | |
| *B01D 35/147* | (2006.01) | |
| *B01D 29/96* | (2006.01) | |
| *F01M 11/03* | (2006.01) | |
| *B01D 35/153* | (2006.01) | |
| *F01M 1/10* | (2006.01) | |

(52) U.S. Cl.
CPC ............... *F01M 11/03* (2013.01); *B01D 29/96* (2013.01); *F01M 2001/1064* (2013.01); *B01D 35/153* (2013.01)
USPC ........................... 210/248; 210/232; 210/234

(58) Field of Classification Search
USPC .......................................... 210/232, 234, 248
See application file for complete search history.

(56) References Cited

U.S. PATENT DOCUMENTS

| | | | |
|---|---|---|---|
| 2,693,281 A * | 11/1954 | Winzen ........................ | 210/423 |
| 5,902,479 A | 5/1999 | Fukumori et al. | |
| 7,390,407 B2 * | 6/2008 | Weindorf et al. ............. | 210/234 |
| 2002/0020660 A1 | 2/2002 | Jainek et al. | |
| 2003/0168390 A1 | 9/2003 | Jainek | |
| 2006/0011524 A1 * | 1/2006 | Weindorf et al. ............... | 210/86 |
| 2008/0308481 A1 * | 12/2008 | Wieczorek et al. ........... | 210/232 |

* cited by examiner

*Primary Examiner* — Tony G Soohoo
*Assistant Examiner* — Peter Keyworth
(74) *Attorney, Agent, or Firm* — James Hassselbeck

(57) ABSTRACT

An oil filter for an internal combustion engine has a filter housing having an interior and an exchangeable filter cartridge arranged in the interior of the filter housing. A drainage valve is arranged in the filter housing and has a valve seat and a valve member. The valve member is movable relative to the valve seat in an opening direction that is parallel and coaxial to a longitudinal axis of the filter housing and oriented toward the interior of the filter housing. The valve member is received in the valve seat in a closing direction opposite to the opening direction. The valve member can be pushed out of the filter housing in the closing direction. The valve member and the filter cartridge form together a servicing unit for joint exchange of the valve member and the filter cartridge.

8 Claims, 3 Drawing Sheets

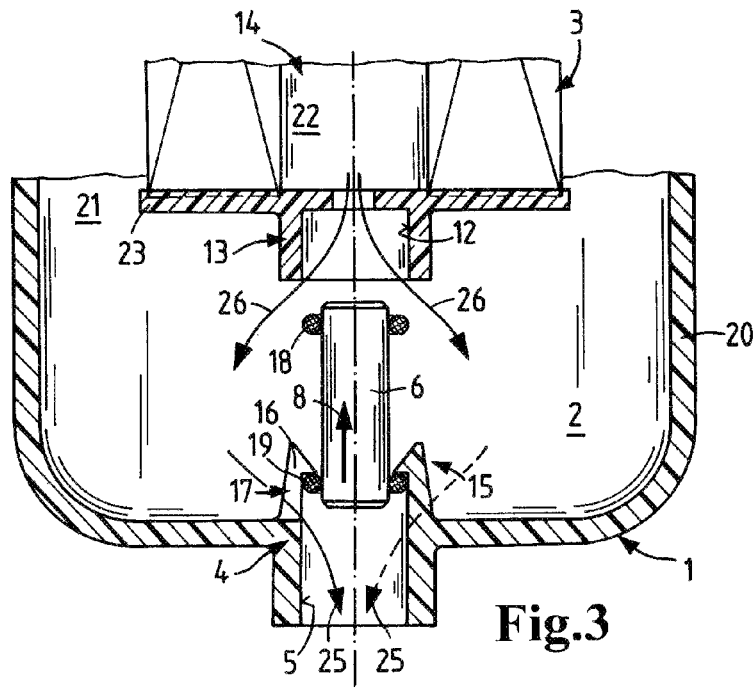
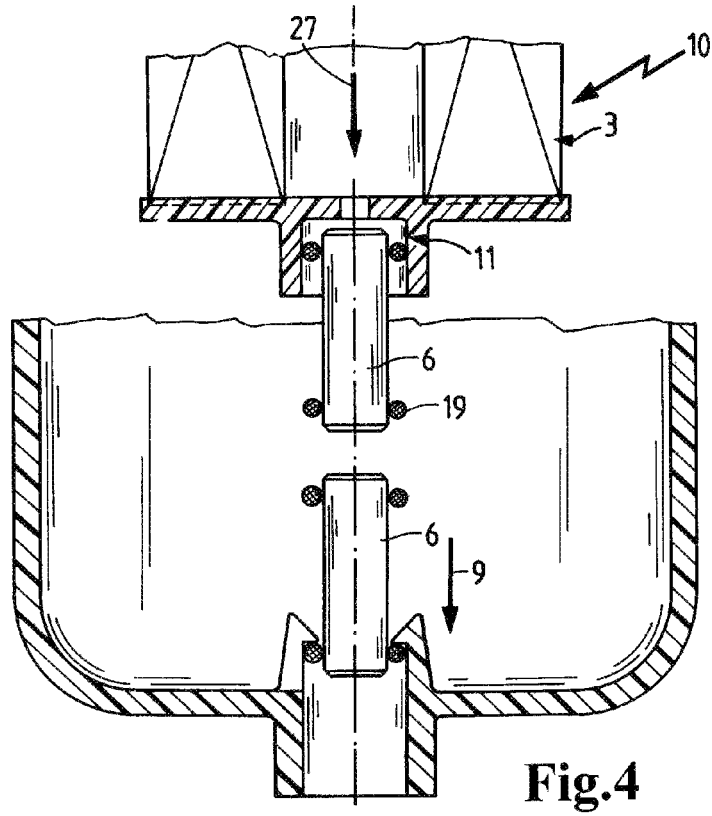

FILTER FOR AN INTERNAL COMBUSTION ENGINE AND FILTER CARTRIDGE FOR THE OIL FILTER

TECHNICAL FIELD

The invention relates to an oil filter for an internal combustion engine, particularly for motor vehicles, having a filter housing, a filter cartridge that is exchangeably arranged in the interior of the filter housing, as well as a drainage valve arranged in the filter housing.

BACKGROUND OF THE INVENTION

The invention relates to an oil filter for an internal combustion engine, especially for motor vehicles, comprising a filter housing, a filter cartridge that is exchangeably arranged in the interior of the filter housing, as well as a drainage valve arranged in the filter housing. The invention further relates to a filter cartridge for such an oil filter.

EP 1 674 142 A1 discloses an oil filter of an internal combustion engine wherein in the interior of its filter housing an exchangeable filter cartridge is arranged. Moreover, the filter housing is provided with a drainage valve at its lower end (relative to the direction of action of gravity), by means of which the filter housing can be drained when exchanging the filter cartridge. In a valve seat of the drainage valve there is a valve member that is movable coaxially to the longitudinal axis of the oil filter and that is locked to a terminal disk of the filter cartridge.

When servicing the oil filter the lower part of the filter housing is unscrewed and pulled downwardly while the filter cartridge initially remains in the operating position in the top part of the filter housing. When removing the lower part of the filter housing, the valve member that is locked to the filter cartridge is moved in the opening direction oriented toward the interior of the filter housing relative to the valve seat so that the drainage valve is opened. The oil that is contained in the interior of the filter housing drains through the open drainage valve in a controlled fashion. Subsequently, the filter cartridge is exchanged.

The assembly is done in reverse order: when axially pushing the bottom part of the filter housing onto the top part, the valve member locked to the filter cartridge is pushed into the valve seat in the closing direction opposite to the opening direction until it meets an axial stop.

Since the valve member when opening the filter housing is pulled out of the valve seat because of its fixed connection to the filter cartridge but remains attached to the filter cartridge, the user can remove the valve member from the used filter cartridge and insert it together with a new filter cartridge. However, this requires that the reusable valve member inclusive its sealing rings must be designed for a long service life by means of complex measures. Also, after multiple reuse of the valve member, there is no guarantee that no damage is done to the sealing rings and that a permanent seal tightness is maintained.

Moreover, the terminal disk of the filter cartridge in the area of the locking connection for the valve member is of solid material. In this way, an oil-tight separation of the interior of the filter cartridge from the exterior is provided. By means of the drainage valve of the filter housing the oil that is located at the unfiltered side of the filter cartridge can be drained but the residual oil in the interior, i.e., at the purified or filtered side, cannot be drained. When removing the used filter cartridge, special care must be taken that no used oil is spilled from the filter cartridge.

SUMMARY OF THE INVENTION

The invention relates to an oil filter for an internal combustion engine, especially for motor vehicles, having a filter housing, a filter cartridge that is exchangeably arranged in the interior of the filter housing, as well as a drainage valve arranged in the filter housing, wherein the drainage valve has a valve seat for a valve member. The valve member is movable relative to the valve seat in an opening direction that is parallel and in particular coaxial to the longitudinal axis of the oil filter and that is oriented toward the interior of the filter housing. In a closing direction opposite to the opening direction, the valve member is inserted into the valve seat of the drainage valve.

The invention further relates to a filter cartridge for such an oil filter.

It is an object of the present invention to further develop an oil filter of the aforementioned kind in such a way that the functional safety of the drainage valve is improved. In accordance with the present invention, this is achieved in that the valve member is adapted to be pushed out of the filter housing in the closing direction and in that the valve member and the filter cartridge together form a servicing unit that is designed for joint exchange of valve member and filter cartridge.

It is a further object of the present invention to further develop a filter cartridge of the aforementioned kind such that servicing of the oil filter can be carried out with improved reliability in a simplified way. In accordance with the present invention this can be realized in that the valve member and the filter cartridge together form a servicing unit that is designed for joint exchange of valve member and filter cartridge.

An oil filter is disclosed in which the valve member of the drainage valve can be pushed out of the filter housing in the closing direction. The valve member forms, together with the associated filter cartridge, a servicing unit provided for joint replacement or exchange. Preferably, the valve member is axially detachably arranged in and, in particular, clamped in a receptacle of the filter cartridge. In this way, when exchanging or replacing the filter cartridge, it is possible that the valve member is separated from the filter cartridge when removing the bottom part of the filter housing and initially remains in the bottom part of the filter housing. The user is then required to insert a new servicing unit including of new filter cartridge and new valve member. Upon insertion the new valve member is pushed in the closing direction into the valve seat and, at the same time, the old valve member that is still seated in the valve seat is pushed out of the valve seat, also in the closing direction. In this way, a misuse of the old (used) valve member by multiple reuses is prevented. The exchange of the servicing unit is simple and requires no special knowledge. The valve member that is always newly inserted when exchanging the filter cartridge can be produced in a simple and inexpensive way; a permanent oil seal-tightness is also ensured. Reliability and functional safety are improved.

In an advantageous further embodiment the valve member forms, together with a valve seat of the filter cartridge, a discharge valve for the interior of the filter cartridge. Expediently, the receptacle for the valve member is formed by the valve seat of the filter cartridge wherein the valve member, by means of a sealing ring, is held by a clamping action in the receptacle of the filter cartridge but otherwise is freely removable. Upon opening of the filter housing the valve member is pulled out of the receptacle or the valve seat of the filter cartridge. The discharge valve of the filter cartridge is also opened. The oil that is contained in the interior (filtered side) of the filter cartridge can then drain by means of the discharge valve of the filter cartridge together with the oil at the unfiltered side through the drainage valve from the interior of the filter housing. An almost complete emptying of the filter housing is possible. The used filter cartridge can then be exchanged without there being a risk of spilling oil and without requiring special attention.

In a preferred further embodiment, the valve seat of the drainage valve has a retaining device acting on the valve member in the opening direction. First, the valve member, when opening the filter housing, is moved in the opening direction relative to its valve seat. This movement is however limited by the retaining device so that the valve member cannot slip out of the valve seat. Instead, a further opening or removal of the bottom part of the housing has the result that the valve member secured by the retaining device is pulled out of the receptacle of the filter cartridge and remains within the filter housing. In this way, a reliable separation of the valve member from the filter cartridge and, simultaneously, a reliable opening of the discharge valve are ensured without the user having to pay special attention to the position of the valve member.

The retaining device is preferably formed by at least one spring tongue. In a constructively simple configuration a high functional safety is ensured in that a new valve member can be easily threaded into the valve seat but cannot be pulled out easily in the opposite direction.

In a preferred embodiment the valve seat of the drainage valve has a drainage opening that is open when the valve member contacts the retaining device. In this way the oil can exit without any hindrance without the valve member having to be pulled extremely far or even completely out of its preferably cylindrical valve seat.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 shows the arrangement according to FIGS. 1 and 2 with the bottom part of the filter housing father removed and additionally opened discharge valve of the filter cartridge;

FIG. 4 shows the removed bottom part of the filter housing of the oil filter according to FIGS. 1 to 3 with the old valve member still attached prior to insertion of a new servicing unit having a new filter cartridge and a new valve member.

DESCRIPTION OF THE PREFERRED EMBODIMENTS

Figure 1:
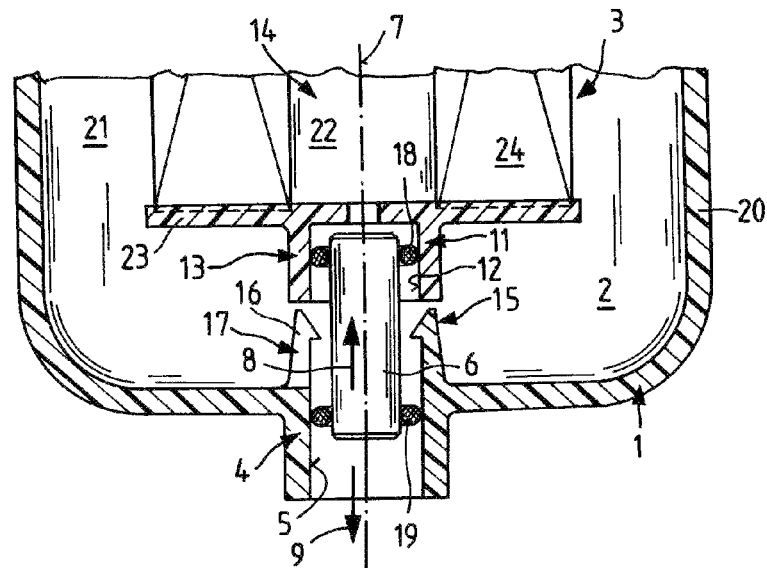
FIG. 1 is a schematic cross-sectional illustration of an oil filter according to the invention in the area of its drainage valve with inserted filter cartridge and valve member in operating state.
Figure 2:
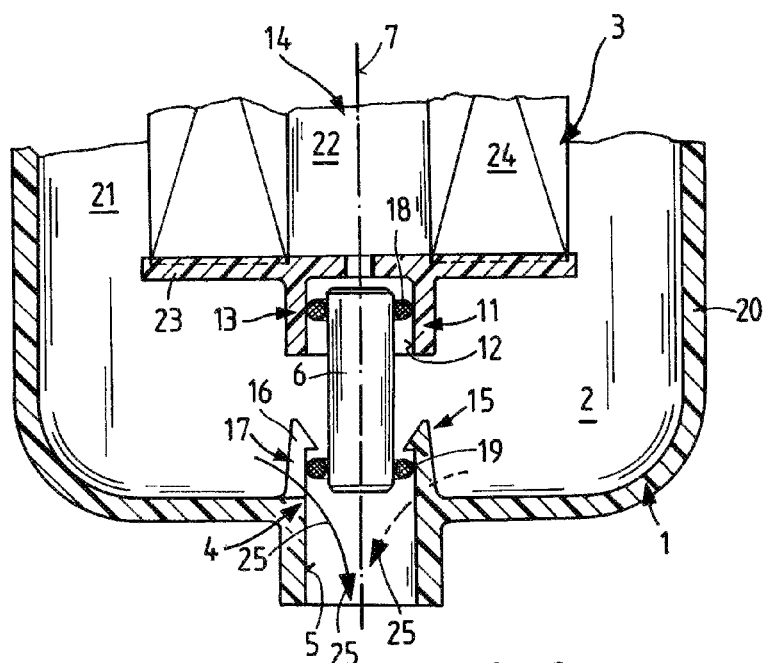
FIG. 2 shows the arrangement according to FIG. 1 with partially released bottom part of the filter housing and opened drainage valve.
Figure 5:
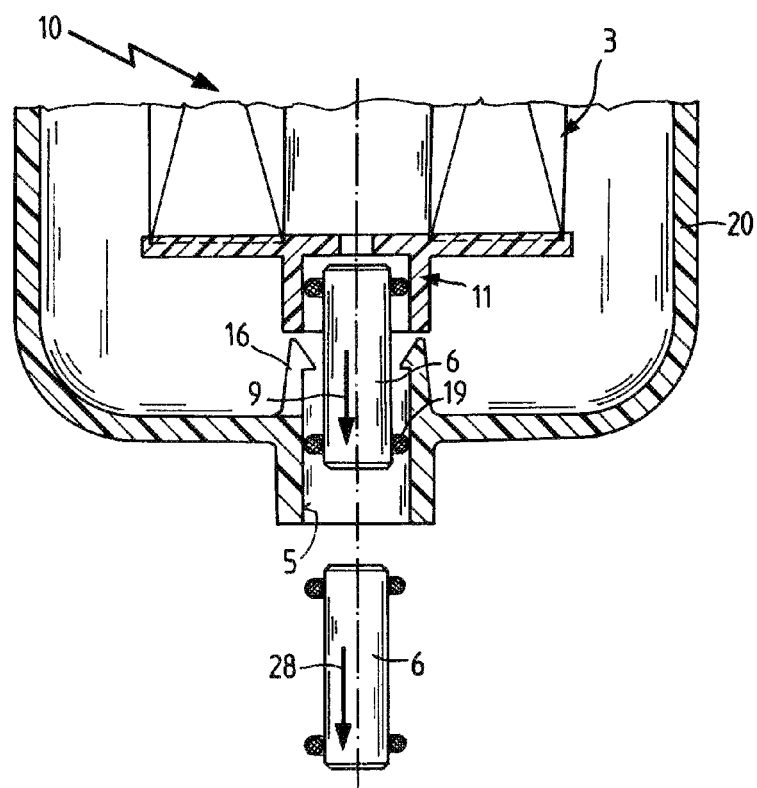
FIG. 5 shows the arrangement according to FIG. 4 with the inserted new servicing unit and pushed-out old valve member of the drainage valve.

FIG. 1 shows in a schematic cross-sectional illustration an oil filter according to the invention of an internal combustion engine, in particular for motor vehicles, in the area of a bottom end, taken in the direction of action of gravity. The oil filter comprises a filter housing 1 of which only the lower area of the removable bottom part 20 of the filter housing is illustrated. In the interior 2 of the filter housing 1 an exchangeable filter cartridge 3 is arranged. The filter housing 1, including its additional components to be described in the following, as well as the filter cartridge 3 are constructed coaxially to a longitudinal axis 7 and essentially have rotational symmetry.

At the lowermost end in the direction of action of gravity, the filter housing 1 is provided with a drainage valve 4 that is positioned on the longitudinal axis 7. The drainage valve 4 comprises a cylindrical valve seat 5 integrally formed in the bottom part 20 of the filter housing in which a valve member 6 that is movable coaxially to the longitudinal axis 7 is secured by a circumferentially extending sealing ring 19 at its lower end. The valve member 6 is movable in the valve seat 5 in the opening direction 8, coaxial to the longitudinal axis 7 and oriented toward the interior 2, and in the oppositely oriented closing direction 9.

The filter cartridge 3 comprises an approximately cylindrical filter member 24 that is provided at its lower end face facing the drainage valve 4 with a terminal disk 23. By means of the terminal disk 23 the radial interior 14 of the filter cartridge 3 is fluidically separated from the exterior. The exterior forms the unfiltered side 21 of the filter cartridge 3 while the interior 14 forms a filtered side 22. By the fluidic separation of raw (unfiltered) side 21 from the purified (filtered) side 22, the oil flow that is entering the filter at the unfiltered side 21 is forced to flow radially from the exterior through the filter member 24 to the interior to the filtered side 22 so that the oil flow is filtered in this way.

At the terminal disk 23 a cylindrical receptacle 11 is integrally formed on its axial exterior side. At the end that is facing the filter cartridge 3 the valve member 6 is provided with a further circumferentially extending sealing ring 18. The valve member 6 is inserted with this sealing ring 18 into the cylindrical receptacle 11 in the opening direction 8 and is secured therein by a clamping action provided by means of this sealing ring 18.

The receptacle 11 is open toward the drainage valve 4 so that the valve member 6 in the closing direction 9 by overcoming the clamping force of the sealing ring 18 can be pulled axially out of the receptacle 11. In the opposite direction, the terminal disk 23 provides a stop for the valve member 6 so that it cannot be pushed into the interior 14 of the filter cartridge 3. Moreover, the receptacle 11 provides a cylindrical valve seat 12 of a discharge valve 13 of the filter cartridge 3 through which the interior 14 of the filter cartridge 3 can be emptied when opening the discharge valve 13. The drainage valve 4 of the oil filter or of the filter housing 1 and the discharge valve 13 of the filter cartridge 3 thus utilize for their function the same valve member 6.

A cylindrical valve seat 5 of the drainage valve 4 is open (enables passage) toward and communicates with the exterior of the filter housing 1 so that the valve member 6, as needed, can be pushed in the closing direction 9 out of the valve seat 5 and out of the filter housing 1. In the opposite direction, i.e., in the opening direction 8, the valve seat 5 has a retaining device 15 for the valve member 6 that, in the illustrated embodiment, is formed by spring tongues 16 distributed in the circumferential direction. Accordingly, the valve member 6 in the opening direction 8 can be moved only so far until it comes to rest against radially inwardly projecting noses of the spring tongues 16 with its sealing ring 19 located at the lower end or with another stop. Distributed in the circumferential direction between the individual spring tongues 16 there are several drainage openings 17 that penetrate radially the cylindrical valve seat 5. As needed, through these drainage openings 17 the oil contained in the interior 2 of the filter housing 1 can be drained as described in the following.

FIG. 1 shows the oil filter in the operating state wherein the upper end of the valve member 6 is positioned seal-tightly with its sealing ring 18 against the valve seat 12 of the discharge valve 13. The terminal disk 23 is thus fluidically closed so that the conveyed oil flow can flow from the raw (unfiltered) side 21 through the filter member 24 to the filtered side 22. The sealing ring 19 at the lower end of the valve member 6 is positioned in its valve seat 5 below the drainage openings 17, i.e., the drainage valve 4 is closed. Oil from the interior 2 cannot flow to the exterior of the filter housing 1.

FIGS. 2 through 5 show in sequential illustrations the process of exchanging the filter cartridge 3. According to FIG. 2, the bottom part 20 of the filter housing is partially released and moved downwardly relative to the filter cartridge 3. The filter cartridge 3 that is secured at the top part (not illustrated) of the filter housing has not changed its position relative to the illustration of FIG. 1. The clamping force of the valve member 6 with its sealing ring 18 in the receptacle 11 is selected such that the valve member 6 also has not changed its relative position to the filter cartridge 3; this means that its lower end with the circumferentially extending sealing ring 19 has been moved upwardly in its valve seat 5 relative to the operating position of FIG. 1 in the opening direction 8. In this connection, the sealing ring 19 is above the lower edge of the drainage openings 17, i.e., they are open. The oil that is contained in the interior 2 of the filter housing 1 at the unfiltered side 21, as indicated by arrows 25, can drain through the drainage openings 17 of the drainage valve 4. The discharge valve 13 of the filter cartridge 3 is still closed so that oil is still contained in the interior 14 of the filter cartridge 3.

In the next step, as illustrated in FIG. 3, the bottom part 20 of the filter housing is moved further downward until the valve member 6 with its lower sealing ring 19 rests against the retaining device 15 or the radial inner noses of the spring tongues 16. The drainage openings 17 remain open. However, since the relative movement of the valve member 6 to the housing part 20 in the opening direction 8 is limited by means of the retaining device 15, a further removal of the bottom part 20 of the filter housing in the downward direction causes the upper end of the valve member 6 with its circumferentially extending sealing ring 18 to be pulled out of the valve seat 12. The discharge valve 13 is opened so that oil contained in the interior 14 at the filtered side 22 can flow out in accordance with arrows 26 through the discharge valve 13 and, together with the other residual oil of the unfiltered side 21, can drain through the drainage openings 17 of the drainage valve 4 in accordance with the arrows 25.

After the bottom part 20 of the filter housing and the filter cartridge 3 are empty, in accordance with the illustration of FIG. 4 a new servicing unit 10 is inserted in the direction of arrow 27, i.e., parallel to the closing direction 9. The servicing unit 10 comprises a new filter cartridge 3 and a new valve member 6 secured in the receptacle 11. Upon insertion of the new servicing unit 10, the new valve member 6 secured therein is pushed in accordance with the illustration of FIG. 5 in the closing direction 9 into the valve seat 5 and the old valve member 6 that in accordance with the illustration of FIG. 4 is still located in the valve seat 5 is pushed out in the direction of arrow 28 (FIG. 5) i.e., in the closing direction 9, out of the valve seat 5 of the bottom part 20 of the filter housing. The spring tongues 16 have ramps acting in the closing direction 9 so that the new valve member 6 with its lower sealing ring 19 is pushed into the valve seat 5 but, in accordance with the illustration of FIG. 2 and FIG. 3, cannot be pulled out again in the opening direction 8.

The housing unit that is preassembled in this way of the bottom part 20 of the filter housing and the servicing unit 10 subsequently can be attached to the top part (not illustrated) of the filter housing. Alternatively, it is also possible to first insert the servicing unit 10 into the top part of the filter housing and to subsequently mount the bottom part 20 of the filter housing on the top part. In this case, the individual components also engage one another in the afore described way.

While the best modes for carrying out the invention have been described in detail, those familiar with the art to which this invention relates will recognize various alternative designs and embodiments for practicing the invention within the scope of the appended claims.

The invention claimed is:

1. An oil filter for an internal combustion engine, the oil filter comprising:
 a filter housing having an open interior;
 an exchangeable filter cartridge arranged in said interior of said filter housing, said exchangeable filter cartridge including
  a cylindrical filter member of filter material encircling circumferentially around a central longitudinal axis of the cylindrical filter member;
  the cylindrical filter member having an open interior extending axially through an interior of cylindrical filter member on the central longitudinal axis, the open interior circumferentially enclosed by the cylindrical filter member;
  a terminal end disk having an axially interior side arranged on an axially lower end face of the cylindrical filter member, the terminal end disk having an axially opposing exterior side of the terminal disk spaced axially outwardly from the interior side of the terminal disk, the terminal disk including a first valve comprising:
   an axially extending cylindrical receptacle member formed integrally with the terminal end disk on the axially exterior side of the terminal disk;
   the cylindrical receptacle member having an axially extending open interior circumferentially enclosed by an axially extending cylindrical inner wall of the cylindrical receptacle member, the axially extending cylindrical inner wall forming an axially extending cylindrical valve seat radially surrounding the axially extending open interior of the cylindrical receptacle member and aligned on the central longitudinal axis; and
   a drain opening extending axially through the terminal end disk from the exterior side to the interior side of the terminal end disk,
    the drain opening at the terminal disk interior side opening into the open interior of the cylindrical filter member, and
    the drain opening at the terminal disk exterior side opening into the axially extending open interior of the cylindrical receptacle member;
  an axially elongated cylindrical valve member including:
   a first seal ring arranged circumferentially on an outer cylindrical surface of the cylindrical valve member and proximate to a first axial end of the cylindrical valve member,
    wherein the first seal ring seals seal-tightly between the axially extending cylindrical valve seat of the cylindrical receptacle member and the outer cylindrical surface of the cylindrical valve member; and a second seal ring arranged circumferentially the outer cylindrical surface of the cylindrical valve member proximate to an opposing second axial end of the cylindrical valve member;

wherein the filter housing has a housing bottom wall having an interior side within the filter housing and an exterior side, the filter housing having a second valve including:

a cylindrical drainage valve housing formed on the exterior side of the housing bottom wall and extending axially outwardly therefrom, the cylindrical drainage valve housing including:

an axially open interior arranged on the central axis and opening axially from the interior of the filter housing through the bottom wall to the exterior of the filter housing; and a cylindrical axially extending radially interior wall circumferentially surrounding the axially extending open interior of the cylindrical drainage valve housing, the axially extending cylindrical interior wall of the cylindrical drainage valve housing forming a second axially extending cylindrical valve seat;

wherein the second seal ring of the axially elongated cylindrical valve member seals seal-tightly between the cylindrical axially extending radially interior wall of the second axially extending cylindrical valve seat of the cylindrical drainage valve housing and the outer cylindrical surface of the cylindrical valve member;

wherein said cylindrical valve member is axially slideable on its first seal ring against the axially extending cylindrical valve seat of the cylindrical receptacle member and axially slideable on its second seal ring against the second axially extending cylindrical valve seat of the cylindrical drainage valve housing;

wherein said cylindrical valve member is axially slideable along said central axis of said cylindrical filter member between a drainage valve closed position in which fluid in said open interior of said filter member is prevented from flowing through said first valve to the exterior of the filter element and prevented from flowing from the filter housing interior though the second valve to exit said filter housing; and a drainage valve open position in which fluid in said open interior of said filter member is enabled to flow through said first valve to the exterior of the filter element and flow from the filter housing interior though the second valve to exit said filter housing.

2. The oil filter according to claim 1, wherein said valve member is detachably secured in said receptacle of said filter cartridge.

3. The oil filter according to claim 2, wherein said valve member is secured by clamping in said receptacle of said filter cartridge.

4. The oil filter according to claim 3, wherein said cylindrical valve member is removeably secured in said first valve by clamping forces between said cylindrical valve member and said axially extending cylindrical valve seat of the cylindrical receptacle member through said first seal ring.

5. The oil filter according to claim 1, wherein said second axially extending cylindrical valve seat of said second valve comprises a retaining device acting on said axially elongated cylindrical valve member in said opening direction.

6. The oil filter according to claim 5, wherein said retaining device is comprised of at least one spring tongue.

7. The oil filter according to claim 5, wherein said valve seat of said second valve has a drainage opening configured to open when said axially elongated cylindrical valve member rests against said retaining device.

8. The oil filter according to claim 6, wherein said spring tongues of said retaining device permitting insertion of said second end of said cylindrical valve member into said axially extending cylindrical valve seat of said second valve, and wherein after said insertion, said spring tongues of said retaining device acting as stops preventing removal of said valve member from said second valve in a valve opening direction;

wherein distributed between said spring tongues are drainage openings through which said filter housing drains through said second valve when said valve member is moved in said valve opening direction.

* * * * *